(12) United States Patent
Oshima et al.

(10) Patent No.: US 11,070,417 B2
(45) Date of Patent: Jul. 20, 2021

(54) SENSOR RELAY APPARATUS AND SENSOR RELAY SYSTEM

(71) Applicant: NIPPON TELEGRAPH AND TELEPHONE CORPORATION, Tokyo (JP)

(72) Inventors: Shoichi Oshima, Tokyo (JP); Kenichi Matsunaga, Tokyo (JP); Toshihiko Kondo, Tokyo (JP); Hiroki Morimura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 84 days.

(21) Appl. No.: 16/090,569

(22) PCT Filed: Apr. 3, 2017

(86) PCT No.: PCT/JP2017/013910
§ 371 (c)(1),
(2) Date: Oct. 1, 2018

(87) PCT Pub. No.: WO2017/175703
PCT Pub. Date: Oct. 12, 2017

(65) Prior Publication Data
US 2019/0116080 A1 Apr. 18, 2019

(30) Foreign Application Priority Data
Apr. 5, 2016 (JP) .............................. JP2016-075694

(51) Int. Cl.
*H04L 29/08* (2006.01)
*H04L 12/66* (2006.01)
(Continued)

(52) U.S. Cl.
CPC .... *H04L 29/08567* (2013.01); *H04L 12/4625* (2013.01); *H04L 12/66* (2013.01);
(Continued)

(58) Field of Classification Search
CPC ..... H04L 12/2823–238; H04L 12/2836; H04L 12/66; H04L 29/06068; H04L 29/06224;
(Continued)

(56) References Cited

U.S. PATENT DOCUMENTS 9,450,776 B2 * 9/2016 Baum ................. H04L 12/2809
10,581,971 B2 * 3/2020 Sun ...................... H04L 67/2823
(Continued)

FOREIGN PATENT DOCUMENTS

CN 101984706 A 3/2011
CN 103518352 A 1/2014
(Continued)

OTHER PUBLICATIONS

Q. Zhu, R. Wang, Q. Chen, Y. Liu and W. Qin, "IOT Gateway: BridgingWireless Sensor Networks into Internet of Things," 2010 IEEE/IFIP International Conference on Embedded and Ubiquitous Computing, Hong Kong, China, 2010, pp. 347-352.*
(Continued)

*Primary Examiner* — Brendan Y Higa
(74) *Attorney, Agent, or Firm* — Womble Bond Dickinson (US) LLP

(57) ABSTRACT

In a sensor relay apparatus (10), a storage unit (11) stores a communication protocol correspondence list (22B) in which a sensor terminal (ST) and a communication protocol are registered in association with each other, and a communication format (22C) to be used in the communication protocol, a relay processing unit (12) communicates with the sensor terminal (ST) specified in the communication protocol correspondence list (22B) based on the communication
(Continued)

protocol associated with the sensor terminal (ST), receives sensor data detected by the sensor terminal (ST), converts the format of the sensor data based on the communication format (22C) in association with the communication protocol, and relays and transfers the sensor data to a processing apparatus (20), and a relay managing unit (16) updates the communication protocol correspondence list (22B) or the communication format (22C) in the storage unit (11), based on a communication protocol correspondence list or a communication format newly notified from the processing apparatus (20).

20 Claims, 11 Drawing Sheets

(51) Int. Cl.
    *H04L 12/46*         (2006.01)
    *H04L 29/06*         (2006.01)
    *H04L 12/24*         (2006.01)
    *H04Q 9/00*          (2006.01)

(52) U.S. Cl.
    CPC ........ *H04L 29/06* (2013.01); *H04L 29/06068* (2013.01); *H04L 29/08711* (2013.01); *H04L 41/082* (2013.01); *H04L 41/0809* (2013.01); *H04L 67/125* (2013.01); *H04L 67/2823* (2013.01); *H04L 69/08* (2013.01); *H04Q 9/00* (2013.01)

(58) Field of Classification Search
    CPC ......... H04L 29/08135; H04L 29/08558; H04L 29/08567; H04L 29/08756; H04L 41/02226; H04L 41/04–06; H04L 41/08–082; H04L 41/0889; H04L 41/12; H04L 43/06–08; H04L 67/10; H04L 67/12–125; H04L 67/2823; H04L 67/34; H04L 69/08; H04L 12/2803; H04L 12/2807–2816; H04L 12/283–2836; H04L 29/06544; H04L 29/12962; H04L 61/6081; G06F 11/3065–3086; H04W 4/38

See application file for complete search history.

(56) References Cited

U.S. PATENT DOCUMENTS

| | | | |
|---|---|---|---|
| 2002/0158775 A1 | 10/2002 | Wallace | |
| 2006/0190458 A1* | 8/2006 | Mishina | H04L 67/125 |
| 2007/0118253 A1* | 5/2007 | Dahler | H04L 67/303 |
| | | | 701/1 |
| 2007/0210916 A1* | 9/2007 | Ogushi | G06Q 10/0875 |
| | | | 340/531 |
| 2007/0255856 A1* | 11/2007 | Reckamp | H04L 69/08 |
| | | | 709/250 |
| 2007/0283001 A1* | 12/2007 | Spiess | H04L 43/00 |
| | | | 709/224 |
| 2009/0316701 A1 | 12/2009 | Yoo et al. | |
| 2010/0153853 A1* | 6/2010 | Dawes | H04L 67/025 |
| | | | 715/736 |
| 2012/0176938 A1* | 7/2012 | Padmanabh | H04W 4/38 |
| | | | 370/255 |
| 2014/0074994 A1 | 3/2014 | Honda et al. | |
| 2014/0122806 A1* | 5/2014 | Lin | H04L 67/12 |
| | | | 711/126 |
| 2014/0167928 A1* | 6/2014 | Burd | H04L 12/4633 |
| | | | 340/12.5 |
| 2015/0006450 A1* | 1/2015 | Ferre | H04L 41/12 |
| | | | 706/14 |
| 2015/0172424 A1 | 6/2015 | Sone et al. | |
| 2016/0087933 A1* | 3/2016 | Johnson | H04W 12/0023 |
| | | | 709/245 |
| 2016/0156768 A1* | 6/2016 | Kim | H04L 12/12 |
| | | | 455/420 |
| 2016/0334811 A1* | 11/2016 | Marten | G05B 15/02 |
| 2017/0086011 A1* | 3/2017 | Neves | H04B 1/3822 |
| 2018/0034914 A1* | 2/2018 | Christopher | H04L 69/08 |
| 2018/0294995 A1* | 10/2018 | Stamatakis | H04L 12/66 |
| 2018/0331843 A1* | 11/2018 | Bag | H04W 4/70 |

FOREIGN PATENT DOCUMENTS

| | | |
|---|---|---|
| CN | 103944813 A | 7/2014 |
| CN | 104426950 A | 3/2015 |
| CN | 204906423 U | 12/2015 |
| EP | 2884714 A1 | 6/2015 |
| JP | 2015-070573 A | 4/2015 |
| JP | 2015-115832 A | 6/2015 |
| WO | WO 2012/157112 A1 | 11/2012 |

OTHER PUBLICATIONS

Written Opinion received for PCT Patent Application No. PCT/JP2017/013910, dated Jun. 13, 2017, 9 pages (5 pages of English Translation and 4 pages of Original Document).

International Preliminary Report on Patentability received for PCT Patent Application No. PCT/JP2017/013910, dated Oct. 18, 2018, 12 pages (7 pages of English Translation and 5 pages of Original Document).

Datta et al., "An IoT Gateway Centric Architecture to Provide Novel M2M Services", 2014 IEEE World Forum on Internet of Things (WF-IoT), 2014, 7 pages.

Guevara et al., "Dynamically Reconfigurable WSN Node Based on ISO/IEC/IEEE 21451 TEDS", IEEE Sensors Journal, vol. 15, No. 5, May 2015, pp. 2567-2576.

Luo et al., "Sensor OpenFlow: Enabling Software-Defined Wireless Sensor Networks", IEEE Communications Letters, vol. 16, No. 11, Nov. 2012, pp. 1896-1899.

Office Action received for Japanese Patent Application No. 2018-510587, dated Sep. 3, 2019, 8 pages (4 pages of English Translation and 4 pages of Office Action).

Yamaguchi et al., "IoT for Agriculture "e-kakashi"", The Institute of Electronic Information and Communication Engineers, IEICE Technical Report, vol. 115, No. 290, 2015, 11 pages (English Abstract Submitted).

Yamaguchi, IoT for Agriculture "e-kakashi", IEICE Technical Report, vol. 115, No. 290 (2015).

"International search report," PCT/JP2017/013910 (dated Jun. 13, 2017).

Supplementary European Search Report and Written Opinion received for EP Patent Application No. 17779081.3, dated Nov. 6, 2019, 7 pages.

Office Action received for Japanese Patent Application No. 2018-510587, dated Feb. 19, 2019, 6 pages (3 pages of English Translation and 3 pages of Office Action).

Ohkouchi et al., "Proposal of Biological Information Collection Systems of Medical and Health Equipment", DICOM02014 Symposium, Jul. 2014, 23 pages (with English Translation).

Office Action received for Chinese Patent Application No. 201780021265.1, dated Jun. 30, 2020, 18 pages (11 pages of English Translation and 7 pages of Office Action).

\* cited by examiner

FIG.2

| RELAY APPARATUS ID | SENSOR TERMINAL ID LIST |
|---|---|
| | |

FIG.3

| SENSOR TERMINAL ID | COMMUNICATION PROTOCOL NAME | COMMUNICATION FORMAT NAME | COMMUNICATION PROFILE NAME |
|---|---|---|---|
| | | | |

SENSOR RELAY APPARATUS AND SENSOR RELAY SYSTEM

TECHNICAL FIELD

The present invention relates to a sensor relay technology for relaying and transferring sensor data detected by a plurality of sensor terminals to a processing apparatus.

BACKGROUND ART

When collecting sensor data such as biological information from medical equipment or health equipment, a sensor relay system relays and connects sensor data detected by various sensor terminals to a processing apparatus such as a server via a sensor relay apparatus or a communication network. As shown in FIG. 12, in a conventional sensor relay system 50, N sensor terminals #1, #2, ..., #N (ST) are connected to a sensor relay apparatus 51 via a wireless or wired communication channel or line. The sensor relay apparatus 51 is connected to a processing apparatus 52 such as a server via a communication network NW.

When relaying and transferring sensor data by the sensor relay apparatus in this conventional technique, the sensor relay system is constructed by selecting communication protocols and communication formats in advance for exchanging the sensor data in accordance with the communication protocols of the sensor terminals and the speed and capacity of the sensor data. Once the sensor relay system is being constructed, it is difficult to easily introduce a new sensor terminal implemented with a new communication protocol or new communication format. This makes it necessary to develop a new sensor terminal having the existing communication protocol or existing communication format.

RELATED ART LITERATURE

Non-Patent Literature

Non-Patent Literature 1: Ohkouchi et al., "Proposal of Biological Information Collection Systems of Medical and Health Equipment", DICIM2014 Symposium, July 2014.

DISCLOSURE OF INVENTION

Problem to be Solved by the Invention

The present invention has been made to solve the above problem, and has as its object to provide a sensor relay technique capable of easily introducing a new sensor terminal having a new communication protocol or new communication format.

Means of Solution to the Problem

In order to achieve the above object, a sensor relay apparatus according to the present invention is a sensor relay apparatus for relaying and transferring sensor data detected by a plurality of sensor terminals to a processing apparatus, including a storage unit configured to store a communication protocol correspondence list in which the sensor terminal and a communication protocol are registered in association with each other, and a communication format to be used in the communication protocol, a relay processing unit configured to receive sensor data detected by the sensor terminal by communicating with the sensor terminal based on a communication protocol associated with the sensor terminal and specified in the communication protocol correspondence list, convert a format of the sensor data based on the communication format in association with the communication protocol, and relays and transfers the sensor data to the processing apparatus, and a relay managing unit configured to update the communication protocol correspondence list or the communication format based on a communication protocol correspondence list or a communication format newly notified from the processing apparatus.

A sensor relay system according to the present invention includes a plurality of sensor relay apparatuses configured to relay and transfer sensor data detected by a plurality of sensor terminals, and a processing apparatus configured to process the sensor data relayed and transferred from the sensor relay apparatus, wherein the sensor relay apparatus is the above-described sensor relay apparatus.

Effect of the Invention

According to the present invention, when a new communication protocol or new communication format is needed to apply, the new communication protocol or new communication format distributed from the processing apparatus is automatically set in the sensor relay apparatus and used to receive and relay/transfer sensor data. Hence, even after the sensor relay system is constructed, a new sensor terminal having the new communication protocol or new communication format can be easily introduced without any significant configuration change or heavy workload.

BRIEF DESCRIPTION OF DRAWINGS

FIG. 2 shows a configuration example of a sensor terminal list;

FIG. 3 is a configuration example of a communication protocol correspondence list;

BEST MODE FOR CARRYING OUT THE INVENTION

Embodiments of the present invention will be explained below with reference to the accompanying drawings.

[First Embodiment]

Figure 1:
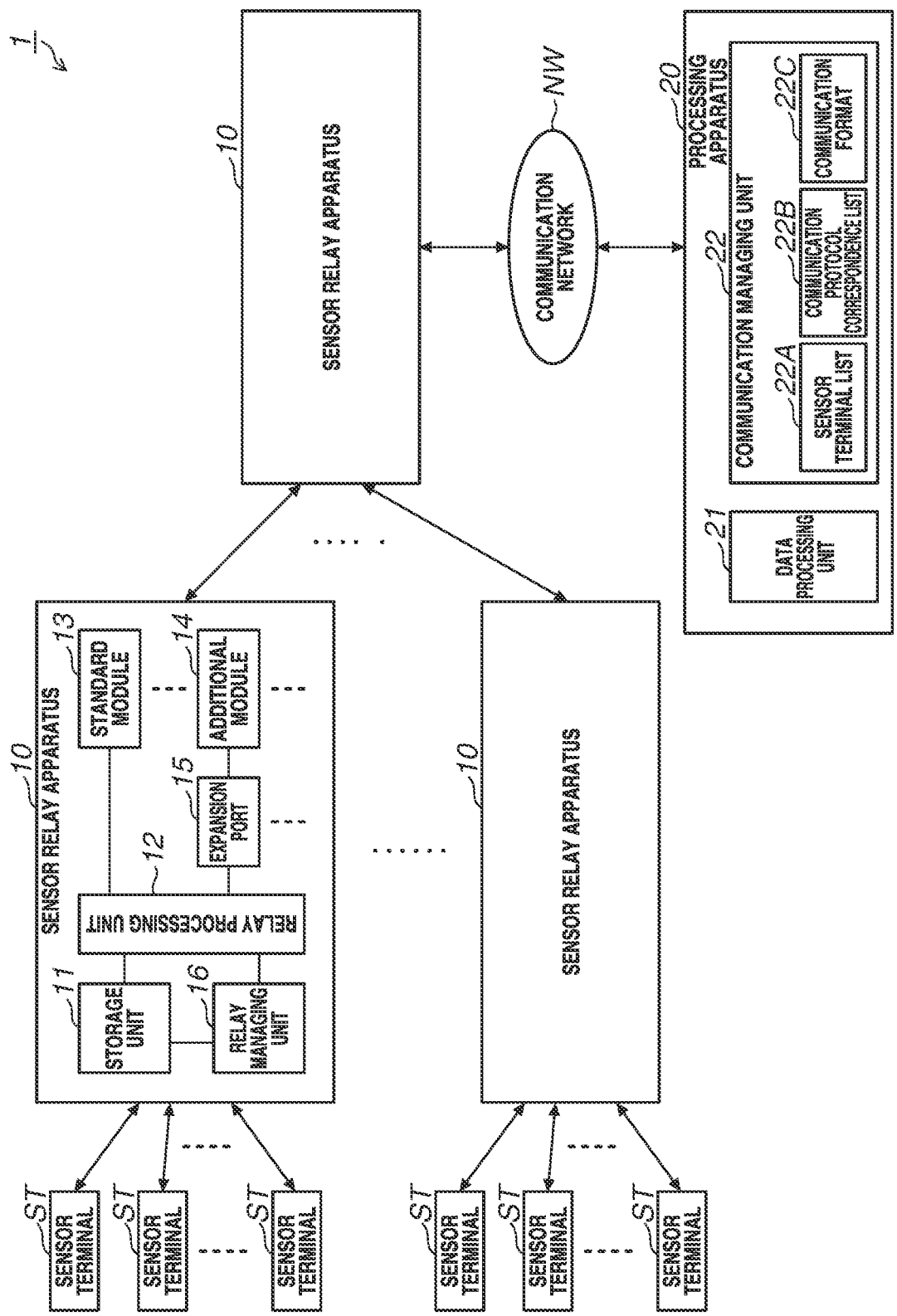
FIG. 1 is a block diagram showing the configuration of a sensor relay system according to the first embodiment.

First, a sensor relay system 1 according to the first embodiment of the present invention will be explained with reference to FIG. 1.

The sensor relay system 1 is used to collect various kinds of sensor data such as security data obtained by sensor apparatuses from buildings and facilities, and biological information detected by wearable sensors from human bodies. The sensor relay system 1 also has a function that allows a sensor relay apparatus 10 to receive sensor data detected by sensor terminals ST from objects, and transfer the sensor data to a processing apparatus 20 via a communication network NW.

The sensor terminals ST include sensors having relatively low sensing capacity such as a temperature sensor and acceleration sensor, and also sensor terminals having relatively high sensing capacity such as cameras for capturing moving images and still images.

The processing apparatus 20 is, as a whole, an information processing apparatus such as a server, and has a function of detecting the status of an object or the occurrence of an event based on sensor data received via the communication network NW.

The sensor relay apparatus 10 is connected to the sensor terminals ST via communication channels or lines, and connected to the processing apparatus 20 via the communication network NW. The sensor relay apparatus 10 has a function of receiving sensor data detected and transmitted by the sensor terminals ST, and relaying and transferring the sensor data to the processing apparatus 20 via the communication network NW.

[Sensor Relay Apparatus]

The arrangement of the sensor relay apparatus 10 according to this embodiment will be explained in detail below with reference to FIG. 1.

The sensor relay apparatus 10 includes a storage unit 11, a relay processing unit 12, a standard module 13, an additional module 14, an expansion port 15, and a relay managing unit 16, as main functional units.

The storage unit 11 is a memory device such as a semiconductor memory as a whole, and has a function of storing, as communication management information, a sensor terminal list showing the sensor terminals ST connected to each sensor relay apparatus 10, a communication protocol correspondence list in which communication protocols to be used to communicate with the sensor terminals ST are registered, and communication formats to be used by the individual communication protocols.

In the sensor terminal list, as shown in FIG. 2, for each relay apparatus ID for identifying the sensor relay apparatus 10, the sensor terminals ST connected to the sensor relay apparatus 10 are registered in the form of a list by sensor terminal IDs for identifying the sensor terminals ST.

In the communication protocol correspondence list as shown in FIG. 3, for each sensor terminal ID, a communication protocol name to be used to communicate with the corresponding sensor terminal ST and a communication format name are registered in association with each other.

The communication format includes a packet format indicating the configuration of a packet for transmitting sensor data, and a communication profile indicating various communication parameters such as a communication speed, address, and authentication information to be used to communicate with the sensor terminal ST by the associated wireless protocol.

Basically, the sensor terminal list, communication protocol correspondence list, and communication formats common to all of the sensor relay apparatuses 10 are distributed from the processing apparatus 20 and stored in the storage units 11. However, the processing apparatus 20 may also distribute these pieces of information by omitting portions that are unnecessary in the individual sensor relay apparatuses 10.

The relay processing unit 12 has a function of specifying a communication protocol associated with the sensor terminal ST from the communication protocol correspondence list in the storage unit 11, and, based on this communication protocol, performing data communication with the sensor terminal ST via a wireless or wired communication channel or line, thereby receiving sensor data detected from an object by the sensor terminal ST, a function of converting the format of the received sensor data based on the communication format associated with the communication protocol of the sensor terminal ST and stored in the storage unit 11, and a function of relaying and transferring the converted sensor data to the processing apparatus 20 as a host apparatus via a wireless or wired communication channel or line.

In this system, when the sensor relay apparatus 10 is installed between the sensor relay apparatuses 10 or between the sensor relay apparatus 10 and processing apparatus 20, the relay processing unit 12 relays and transfers sensor data received from a plurality of sensor relay apparatuses 10, instead of the sensor terminals ST, to the sensor relay apparatus 10 or processing apparatus 20 as a host apparatus. In this example shown in FIG. 1, only one sensor relay apparatus 10 is installed between the sensor relay apparatuses 10 accommodating the sensor terminals ST and the processing apparatus 20. However, it is also possible to install a plurality of sensor relay apparatuses 10 hierarchically connected by a tree structure in accordance with the scale of the network. Note that the communication protocols and communication formats to be used to communicate with the sensor relay apparatuses 10 are preset protocols and formats.

The standard module 13 is the module of a communication circuit for exchanging sensor data, which is formed for each communication protocol. More specifically, the standard module 13 includes a communication circuit for performing data communication with the sensor terminal ST and sensor relay apparatus 10 in accordance with each communication protocol, and an I/F circuit for connecting this communication circuit to the relay processing unit 12.

A communication module having a communication protocol that is generally and widely used in the sensor relay system 1 is preinstalled as the standard module 13 in the sensor relay apparatus 10.

The additional module 14 is the module of a communication circuit for exchanging sensor data, which is formed for each communication protocol, like the standard module 13. More specifically, the additional module 14 includes a communication circuit for performing data communication with the sensor terminal ST and sensor relay apparatus 10 in accordance with each communication protocol, and an I/F circuit for connecting this communication circuit to the expansion port 15.

When a communication module of a communication protocol other than the standard module 13, e.g., a new communication protocol or special communication protocol becomes necessary, this communication module is additionally connected as the additional module 14 to the sensor relay apparatus 10.

The expansion port 15 is a general I/F circuit such as a USB (Universal Serial Bus), and provided in advance in the sensor relay apparatus 10 as a port for connecting the additional module 14.

The relay managing unit 16 has a function of receiving sensor data by selecting, between the standard module 13 and additional module 14, as a module having a communication protocol to be used to communicate with each sensor terminal ST based on the communication management information notified from the processing apparatus 20, and a function of converting the format of the received sensor data and transferring the sensor data to a host apparatus, based on a communication format and communication profile associated with the communication protocol of the sensor terminal ST.

The relay managing unit 16 stores the sensor terminal list and communication protocol correspondence list as main communication management information. The sensor terminal list is a list showing the sensor terminals ST connected to each sensor relay apparatus 10. The communication protocol correspondence list is a list showing the association between each sensor terminal ST and a communication protocol. In addition, the relay managing unit 16 stores a communication format indicating the format of a packet to be used in each communication protocol, and a communication profile indicating various setting parameters to be used in communication, as the communication management information. The processing apparatus 20 notifies each sensor relay apparatus 10 of these pieces of communication management information beforehand, and the relay managing unit 16 stores the information.

The sensor relay apparatus 10 can add/change a communication method between the sensor terminal ST and sensor relay apparatus 10, or between the sensor relay apparatuses 10, by adding/changing a communication module. Consequently, a new sensor terminal or new sensor relay apparatus having a new communication protocol or new communication format can easily be introduced to the existing sensor relay apparatus 10.

Figure 6:
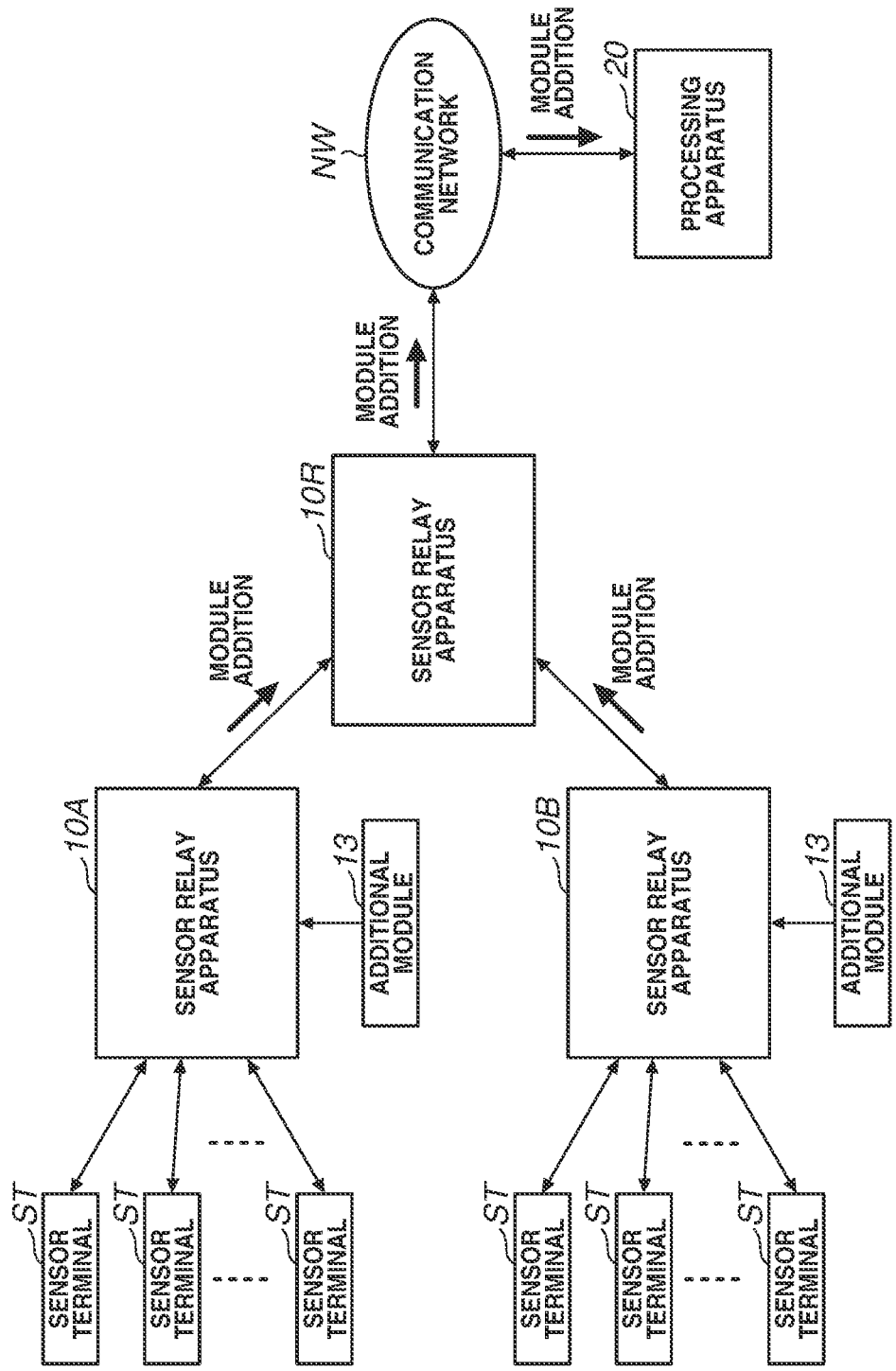
FIG. 6 is a diagram for explaining a notification example of a module addition.

For example, when a new communication module to be used in data communication with the sensor terminal ST is additionally connected as the additional module 14 to the expansion port 15 of the sensor relay apparatus 10, as shown in FIG. 6 (to be described later), the processing apparatus 20 is notified of the addition of the additional module 14 via the communication network NW. Therefore, the processing apparatus 20 can automatically transmit the corresponding sensor terminal list and format information to the sensor relay apparatus 10.

Accordingly, the sensor relay apparatus 10 can accommodate a new sensor terminal ST via the network by a series of simple operations, by detecting the new sensor in accordance with the sensor terminal list from the processing apparatus 20.

Also, when changing the communication method between the sensor relay apparatuses 10 by changing the communication module, communication between the sensor relay apparatuses 10 is temporarily interrupted after the module is removed. However, the relay managing unit 16 can automatically post a link again after the module is changed, so data communication corresponding to the new communication method can be started.

[Processing Apparatus]

The arrangement of the processing apparatus 20 according to this embodiment will be explained in detail below with reference to FIG. 1.

The processing apparatus 20 includes a data processing unit 21 and a communication managing unit 22 as main functional units.

The data processing unit 21 has a function of detecting the status of an object or the occurrence of an event by analyzing sensor data received from the sensor relay apparatus 10 via the communication network NW.

The communication managing unit 22 has a function of distributing new communication management information to the sensor relay apparatus 10, when the administrator changes the communication management information to be used in the sensor relay apparatus 10, or in response to a request from an arbitrary sensor relay apparatus 10.

The communication managing unit 22 stores a sensor terminal list 22A, a communication protocol correspondence list 22B, and a communication format 22C, as main communication management information.

The sensor terminal list 22A is a list showing the sensor terminals ST connected to each sensor relay apparatus 10, and has the same configuration as that shown in FIG. 2 described above.

The communication protocol correspondence list 22B is a list in which each sensor terminal ST and a communication protocol to be used to communicate with the sensor terminal ST are registered in association with each other, and has the same configuration as that shown in FIG. 3 described above.

The communication format 22C includes a packet format indicating the configuration of a packet for transmitting sensor data, and a communication profile indicating various communication parameters such as a communication speed, address, and authentication information to be used to communicate with the sensor terminal ST by the associated wireless protocol.

[Operation of First Embodiment]

The operation of the sensor relay system 1 according to this embodiment will now be explained with reference to FIG. 1 by taking information to be exchanged between the processing apparatus 20 and sensor relay apparatus 10 as an example.

[Update of Communication Protocol Association List]

When the administrator has changed the communication protocol correspondence list 22B in the processing apparatus 20, the communication managing unit 22 of the processing apparatus 20 distributes a new communication protocol correspondence list 22B and an instruction to update the correspondence list to each sensor relay apparatus 10, in response to an operator's instruction received afterward.

Figure 4:
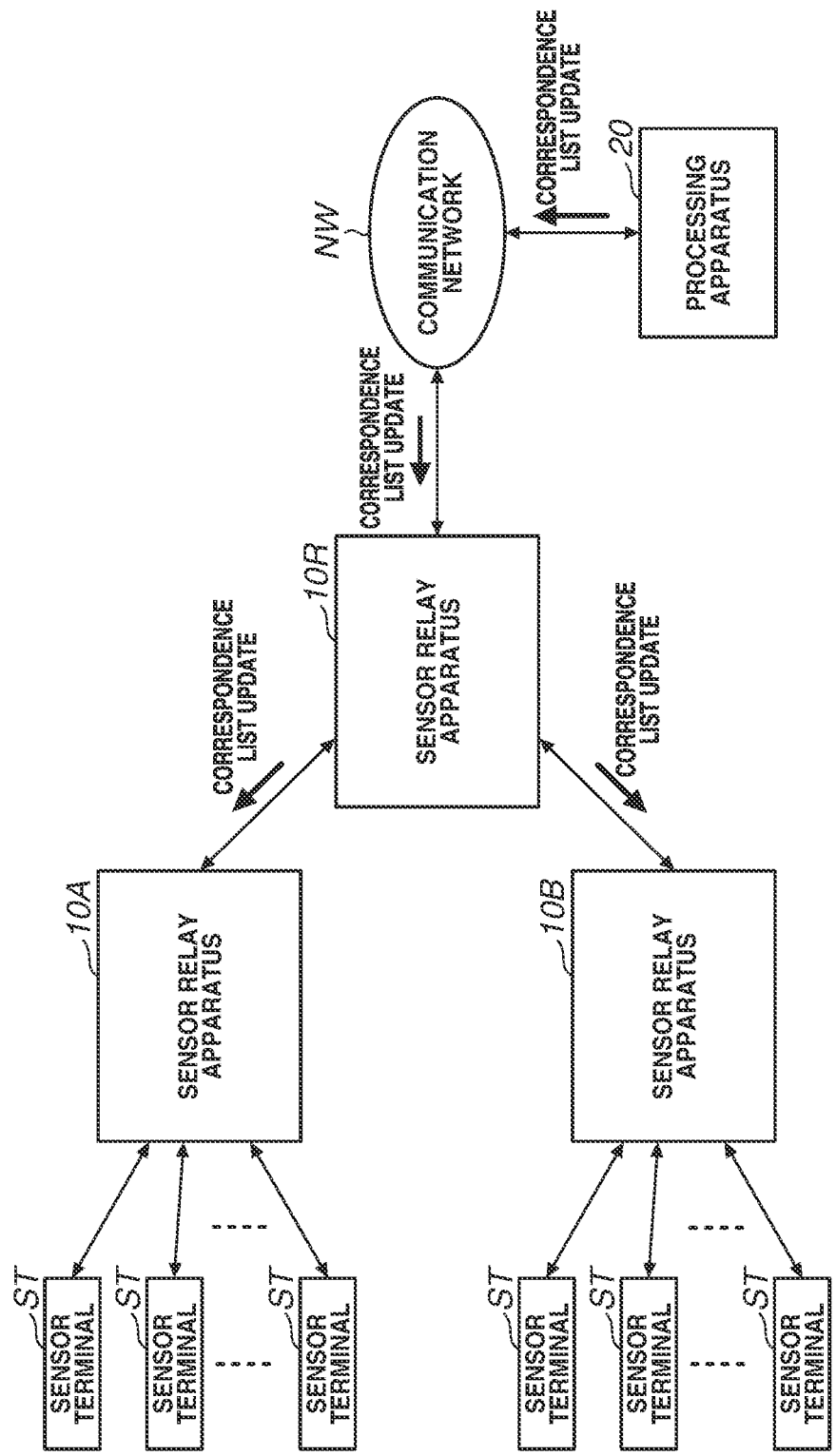
FIG. 4 is a diagram for explaining a distribution example of the communication protocol correspondence list.

In a communication protocol correspondence list distribution example shown in FIG. 4, a sensor relay apparatus 10R is connected to the communication network NW, and two sensor relay apparatuses 10A and 10B are connected to the sensor relay apparatus 10R. A plurality of sensor terminals ST are connected to each of the sensor relay apparatuses 10A and 10B.

The new communication protocol correspondence list and association list update instruction transmitted from the processing apparatus 20 are received by the sensor relay apparatus 10R via the communication network NW, and distributed to the sensor relay apparatuses 10A and 10B.

In response to the reception of the new communication protocol correspondence list and the instruction to update the correspondence list, the relay managing unit 16 of each of the sensor relay apparatuses 10A and 10B updates the existing communication protocol correspondence list stored in the storage unit 11 based on the received new communication protocol correspondence list. Consequently, the new communication protocol correspondence list changed by the administrator is set in each of the sensor relay apparatuses 10A and 10B.

Accordingly, when a communication protocol to be used to communicate with an arbitrary sensor terminal ST is updated to the new communication protocol correspondence list, the relay processing unit 12 selects a module associated with the new communication protocol from the standard module 13 and additional module 14, and receives the sensor data by communicating with the sensor terminal ST based on a communication format and communication profile associated with the new communication protocol.

[Update of Communication Format]

When the administrator has changed the communication format 22C in the processing apparatus 20, the communication managing unit 22 of the processing apparatus 20 distributes a new communication format 22C and an instruction to update the format to each sensor relay apparatus 10, in response to an operator's instruction received afterward.

Figure 5:
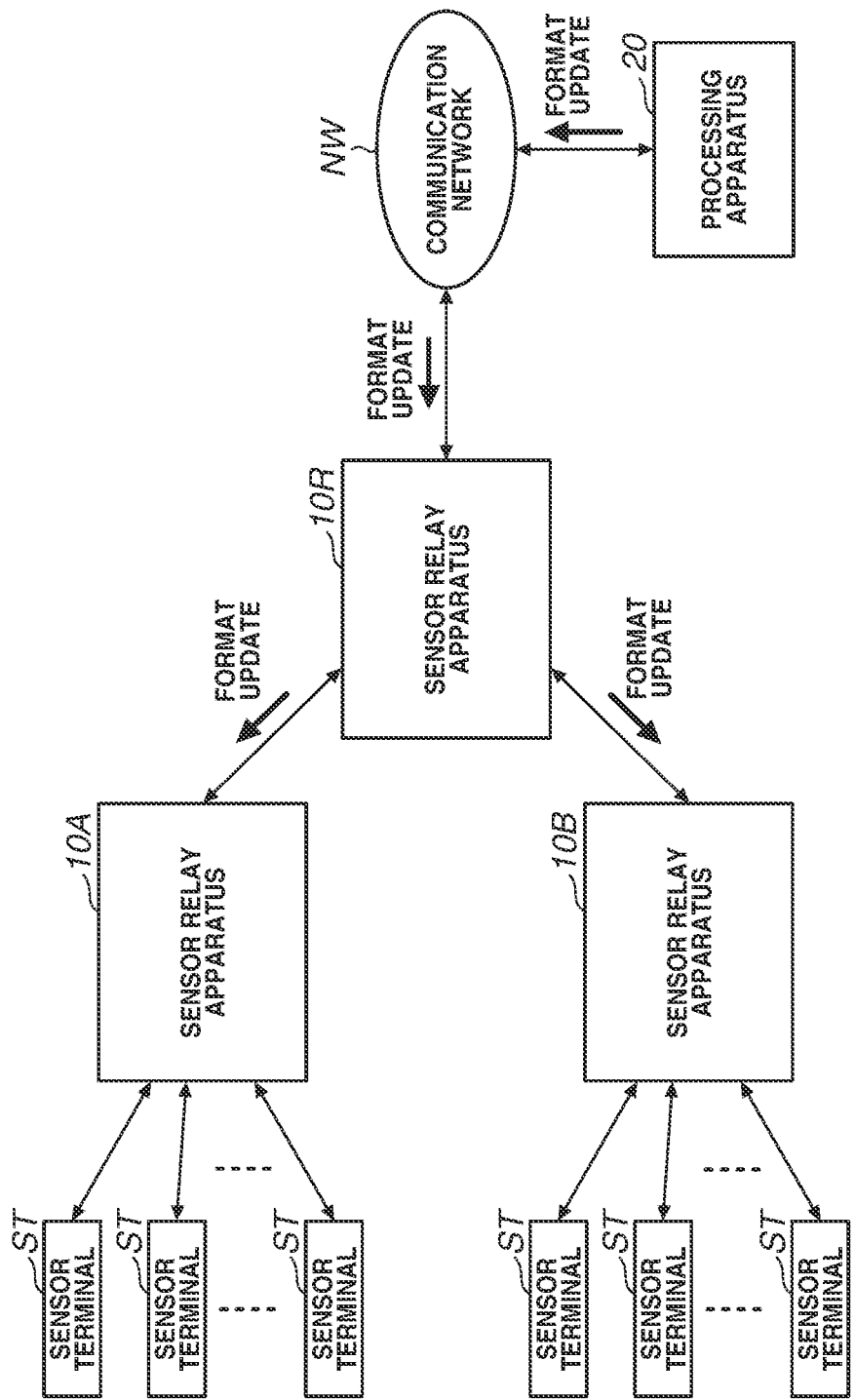
FIG. 5 is a diagram for explaining a distribution example of a communication format.

In a communication format distribution example shown in FIG. 5, the new communication format and format update instruction transmitted from the processing apparatus 20 are received by the sensor relay apparatus 10R via the communication network NW, and distributed to the sensor relay apparatuses 10A and 10B.

In response to the reception of the new communication format and format update instruction, the relay managing unit 16 of each of the sensor relay apparatuses 10A and 10B updates the existing communication format stored in the storage unit 1 based on the received new communication format. Consequently, the new communication format that has been changed by the administrator is set in each of the sensor relay apparatuses 10A and 10B.

Accordingly, when the communication format of an arbitrary communication protocol is updated, the relay processing unit 12 receives sensor data by communicating with the sensor terminal ST based on the new communication format associated with the communication protocol. Also, the relay processing unit 12 converts, based on the new communication format, the format of the received sensor data into the communication format to be used to communicate with the sensor relay apparatus 10R, and relays and transmits the sensor data to the sensor relay apparatus 10R.

[Addition of Module]

When the worker additionally connects a new additional module 14 to the expansion port 15 of the sensor relay apparatus 10 in order to manage the addition of a new sensor terminal ST or the change of the communication protocol, the relay managing unit 16 of the sensor relay apparatus 10 notifies the processing apparatus 20 of the addition of the module.

In a module addition notification example shown in FIG. 6, when detecting the additional connection of a new additional module 14 to the expansion port 15, the relay managing unit 16 of the sensor relay apparatus 10A generates a module addition notification containing module information obtained from the new additional module 14 and addressed to the processing apparatus 20, and transmits the module addition notification to the sensor relay apparatus 10R as a host apparatus.

The sensor relay apparatus 10R transfers this module addition notification to the processing apparatus 20 via the communication network NW.

The communication managing unit 22 of the processing apparatus 20 notifies the administrator of the module information contained in the received module addition notification by displaying the information on the screen. In response to this, the administrator determines whether it is necessary to update the communication protocol correspondence list 22B, communication format 22C, and the like, performs the update as needed, and distributes the results to the sensor relay apparatuses 10A and 10B.

[Addition of Sensor Terminal]

When the worker additionally connects a new sensor terminal STN to the sensor relay apparatus 10, the relay managing unit 16 of the sensor relay apparatus 10 checks the presence/absence of registration in the sensor terminal list based on sensor terminal information obtained from the sensor terminal STN. If the sensor terminal STN is registered in the sensor terminal list and is a known sensor terminal used by any of the sensor relay apparatuses 10, the relay managing unit 16 notifies the processing apparatus 20 of a list addition request.

Figure 7:
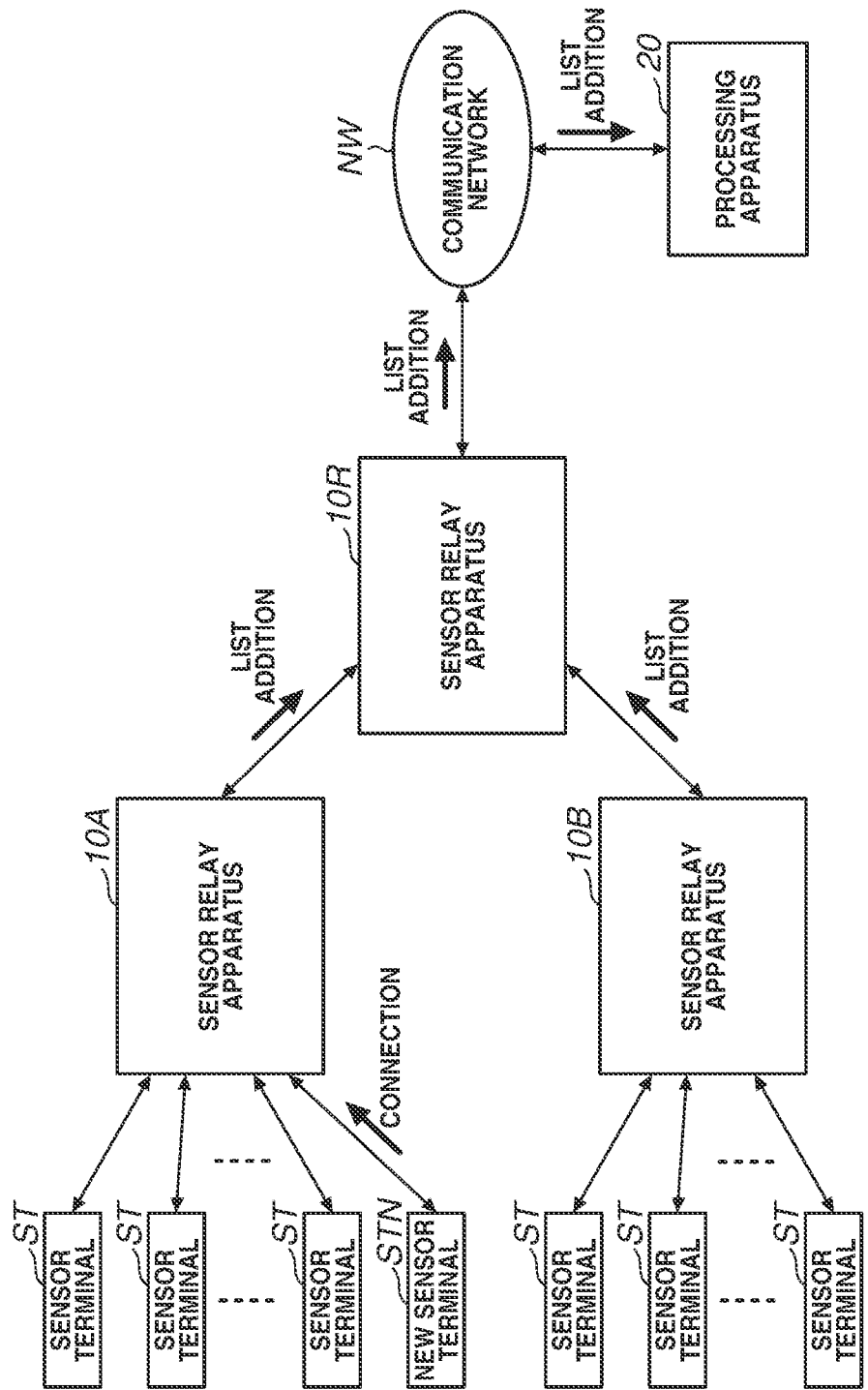
FIG. 7 is a diagram for explaining a notification example of a list addition request.

In a list addition request notification example shown in FIG. 7, when detecting the additional connection of the known sensor terminal STN, the relay managing unit 16 of the sensor relay apparatus 10A generates a list addition request containing sensor terminal information obtained from the sensor terminal STN and addressed to the processing apparatus 20, and transmits the list addition request to the sensor relay apparatus 10R as a host apparatus.

The sensor relay apparatus 10R transfers this list addition request to the processing apparatus 20 via the communication network NW.

Based on the sensor terminal information contained in the received list addition request, the communication managing unit 22 of the processing apparatus 20 additionally registers the sensor terminal STN in the sensor terminal list 22A in association with the sensor relay apparatus 10A, and notifies the administrator of the additional connection of the known sensor terminal STN by displaying this information on the screen. In response to this, the administrator determines whether it is necessary to update the communication protocol correspondence list 22B and communication format 22C, and performs the update as needed. After that, the administrator distributes the updated communication management information to the sensor relay apparatuses 10A and 10B.

On the other hand, if the sensor terminal STN is not registered in the sensor terminal list and is an unknown sensor terminal STN not used by any sensor relay apparatus 10, the relay managing unit 16 notifies the processing apparatus 20 of a non-listed addition request.

Figure 8:
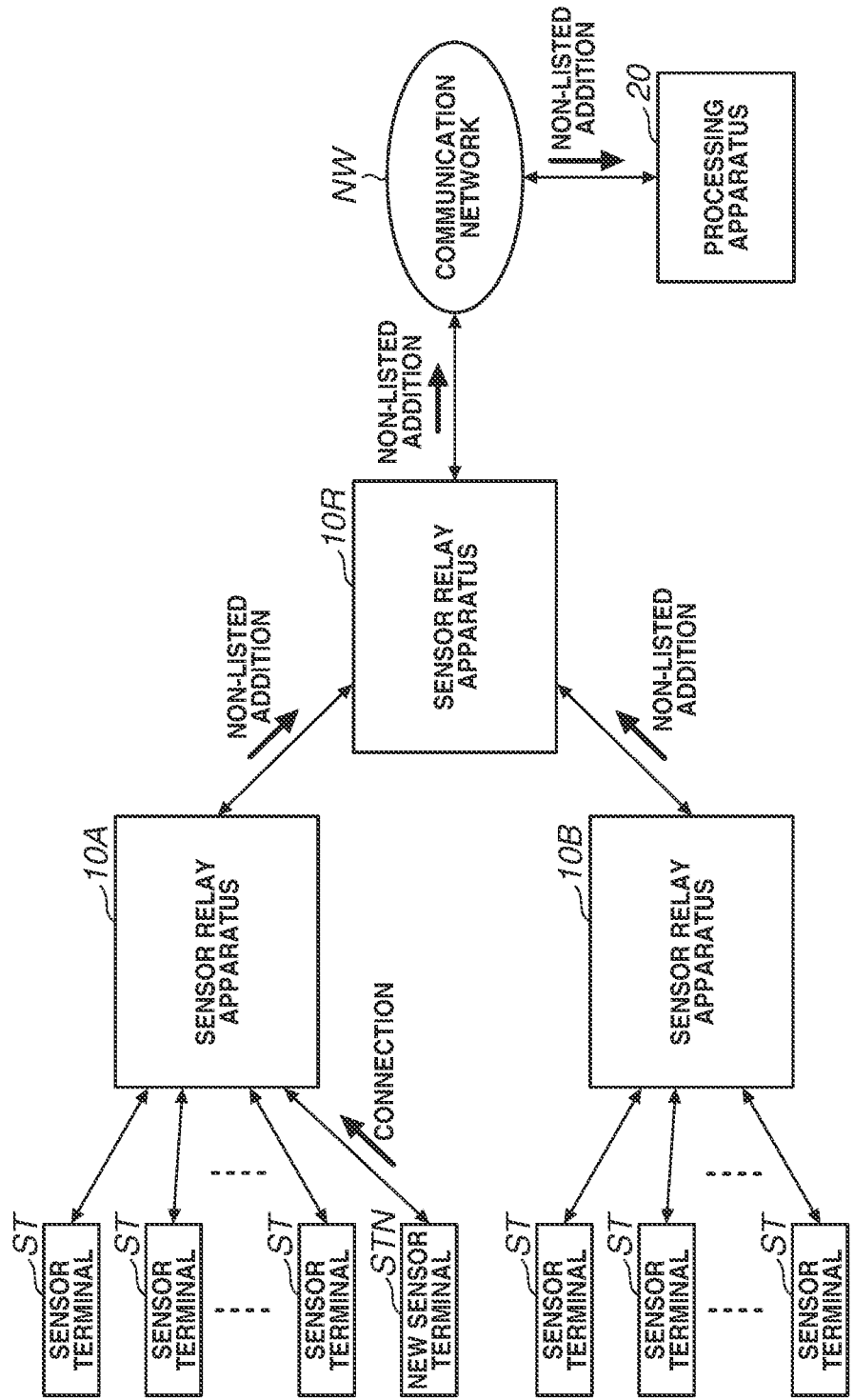
FIG. 8 is a diagram for explaining a notification example of a non-listed addition request.

In a non-listed addition request notification example shown in FIG. 8, when detecting the additional connection of the unknown sensor terminal STN, the relay managing unit 16 of the sensor relay apparatus 10A generates a non-listed addition request containing sensor terminal information obtained from the sensor terminal STN and addressed to the processing apparatus 20, and transmits the non-listed addition request to the sensor relay apparatus 10R as a host apparatus.

The sensor relay apparatus 10R transfers this non-listed addition request to the processing apparatus 20 via the communication network NW.

Based on the sensor terminal information contained in the received non-listed addition request, the communication managing unit 22 of the processing apparatus 20 notifies the administrator of the additional connection of the unknown sensor terminal STN by displaying this information on the screen. In response to this, the administrator determines the connectability of the unknown sensor terminal STN to the sensor relay apparatus 10A based on a work plan or the like.

If the unknown sensor terminal STN is additionally connected according to the work plan and the administrator determines that this additional connection is possible, the communication managing unit 22 notifies the sensor relay apparatus 10A that the sensor terminal STN is connectable. On the other hand, if the unknown sensor terminal STN is not additionally connected according to the work plan, and the administrator determines that this additional connection is not possible, the communication managing unit 22 notifies the sensor relay apparatus 10A that the sensor terminal STN is not connectable. Also, the communication managing unit 22 distributes the communication management information such as the sensor terminal list 22A, communication protocol correspondence list 22B, and communication format 22C updated by the administrator to the sensor relay apparatuses 10A and 10B.

Figure 9:
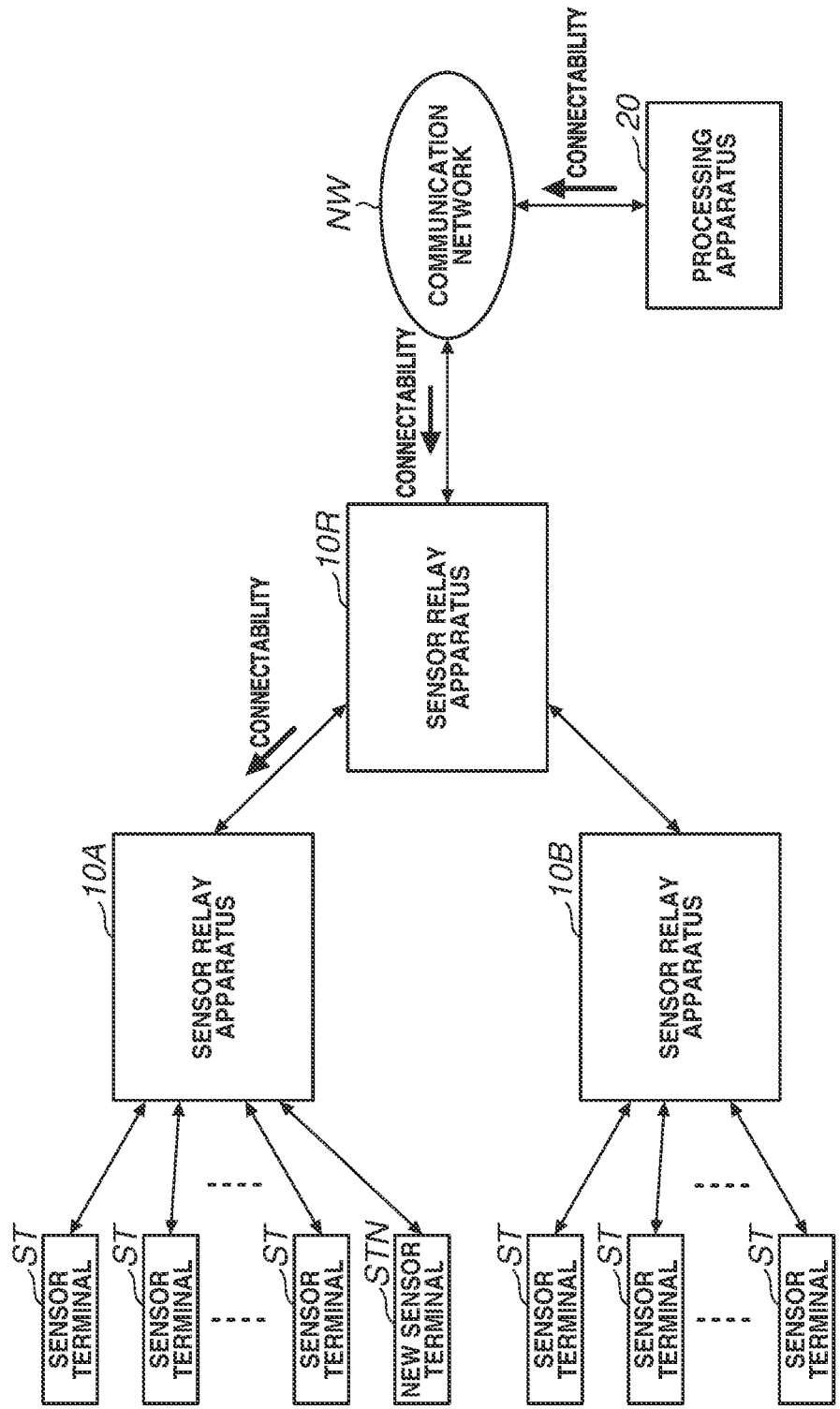
FIG. 9 is a diagram for explaining a notification example of connection feasibility.

In a connectability notification example shown in FIG. 9, the connectability transmitted from the processing apparatus 20 is received by the sensor relay apparatus 10R via the communication network NW and distributed to the sensor relay apparatus 10A.

When notified of "connectable" from the processing apparatus 20 in response to the non-listed addition request, the relay managing unit 16 of each of the sensor relay apparatuses 10A and 10B instructs the relay processing unit 12 to allow communication. In response to this, the relay processing unit 12 starts communicating with the additionally connected sensor terminal STN based on the updated communication management information from the processing apparatus 20, and starts a process of transferring the sensor data received from the sensor terminal STN. On the other hand, when notified of "unconnectable" from the processing apparatus 20 in response to the non-listed addition request, the relay managing unit 16 instructs the relay processing unit 12 not to allow communication. In response to this, the relay processing unit 12 does not start communicating with the additionally connected sensor terminal STN, and does not perform the process of transferring the sensor data.

Also, if the communication protocol for communicating with the additionally connected new sensor terminal STN is not supported yet and the sensor terminal information of the sensor terminal STN cannot be obtained, the relay managing unit 16 notifies the processing apparatus 20 of addition of unsupported indicating that the unsupported sensor terminal ST is additionally connected.

Figure 10:
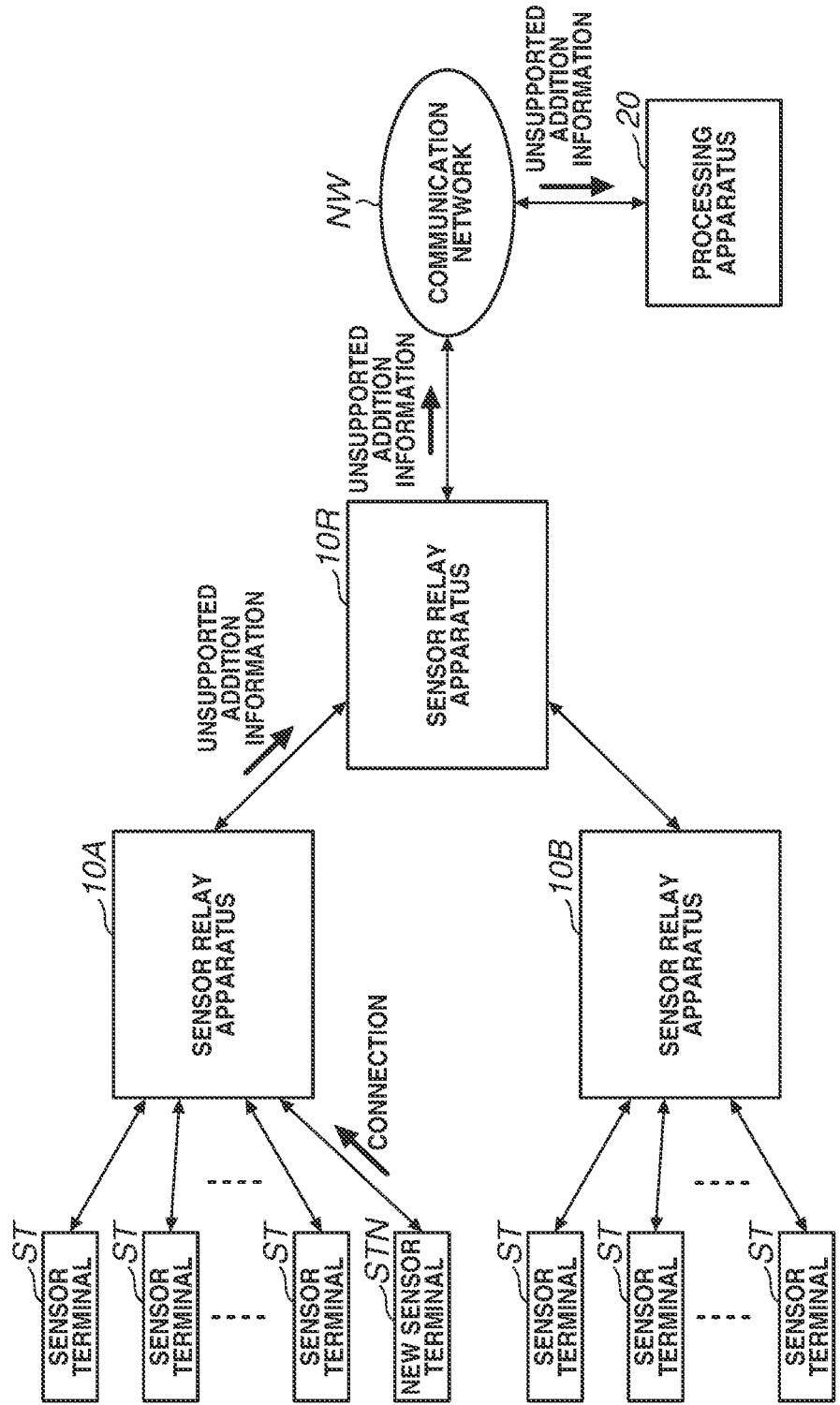
FIG. 10 is a diagram for explaining a notification example of addition of the unsupported.

In an example of a notification of addition of the unsupported shown in FIG. 10, when detecting the additional connection of the unsupported sensor terminal STN, the relay managing unit 16 of the sensor relay apparatus 10A generates a notification of addition of the unsupported addressed to the processing apparatus 20, and transmits the notification of addition of the unsupported to the sensor relay apparatus 10R as a host apparatus.

The sensor relay apparatus 10R transfers this notification of addition of the unsupported to the processing apparatus 20 via the communication network NW.

Based on the received notification of addition of the unsupported, the communication managing unit 22 of the processing apparatus 20 notifies the administrator of the additional connection of the unsupported sensor terminal STN to the sensor relay apparatus 10A by displaying this information on the screen. In response to this, the administrator determines the connectability of the unknown sensor terminal STN to the sensor relay apparatus 10A based on a work plan or the like, and notifies the sensor relay apparatus 10A of the connectability as shown in FIG. 9 described above. When the determination result is "connectable", the administrator distributes the updated communication management information to the sensor relay apparatuses 10A and 10B, and adds a new additional module 14 for communicating with the sensor terminal STN to the sensor relay apparatus 10A as needed.

[Effects of First Embodiment]

In this embodiment as described above, in the sensor relay apparatus 10, the storage unit 11 stores the communication protocol correspondence list in which the sensor terminals ST and communication protocols are registered in association with each other, and the communication formats to be used by the communication protocols, and the relay processing unit 12 communicates with the sensor terminal ST specified from the communication protocol correspondence list based on the communication protocol associated with the sensor terminal ST, thereby receiving sensor data detected by the sensor terminal ST, converting the format of the sensor data based on the communication format associated with the communication protocol, and relaying and transferring the converted sensor data to the processing apparatus 20. Based on the communication protocol correspondence list or communication format newly notified from the processing apparatus 20, the relay managing unit 16 updates the communication protocol correspondence list or communication format in the storage unit 11.

Consequently, when a new communication protocol or communication format becomes necessary, the new communication protocol or communication format distributed from the processing apparatus 20 is automatically set in the sensor relay apparatus 10, and used in the reception and relay/transfer of sensor data.

Even after the sensor relay system is constructed, it is possible to easily introduce a new sensor terminal ST having a new communication protocol or new communication format without any significant configuration change or heavy workload.

Also, in this embodiment, when a new additional module 14 is additionally connected to the expansion port 15, the relay managing unit 16 may notify the processing apparatus 20 of this module addition, and, based on a communication protocol correspondence list or communication format newly notified from the processing apparatus 20 in response to the above notification, update the communication protocol correspondence list or communication format in the storage unit 11.

Accordingly, the communication protocol correspondence list or communication format necessary to communicate with the additionally connected new additional module 14 is distributed from the processing apparatus 20 to the sensor relay apparatus 10 and automatically updated. This makes it possible to greatly reduce the workload involving, e.g., setting the sensor relay apparatus 10 as the new additional module 14 is required.

In this embodiment, the relay managing unit 16 may also notify the processing apparatus 20 of list addition when a new sensor terminal STN is additionally connected, and, based on a communication protocol correspondence list or communication format newly notified from the processing apparatus 20 in response to the above notification, update the communication protocol correspondence list or communication format in the storage unit 11.

Consequently, the communication protocol correspondence list or communication format necessary to communicate with the additionally connected new sensor terminal STN is distributed from the processing apparatus 20 to the sensor relay apparatus 10 and automatically updated. This makes it possible to greatly reduce the workload involving, e.g., setting the sensor relay apparatus 10 as the new additional module 14 is required.

In this case, the relay managing unit 16 may also instruct the relay processing unit 12 whether to communicate with the new sensor terminal STN, in accordance with the connectability of the new sensor terminal STN notified from the processing apparatus 20 in response to list addition.

Accordingly, even when an unconnectable new sensor terminal STN is connected to the sensor relay apparatus 10, it is possible to avoid the relay and transfer of sensor data by mistake, and secure the stability and safety of the sensor relay system 1.

[Second Embodiment]

Next, a sensor relay system 1 according to the second embodiment of the present invention will be explained.

In this embodiment, a processing apparatus 20 notifies a sensor relay apparatus 10 of not only the communication management information explained in the first embodiment but also a communication command.

That is, in this embodiment, a relay managing unit 16 of the sensor relay apparatus 10 has a function of outputting, to a relay processing apparatus 12, a new command designated by a command update instruction notified from the processing apparatus 20.

The relay processing unit 12 has a function of controlling, based on the command output from the relay managing unit 16, communication with a designated sensor terminal ST, a process of receiving sensor data from the designated sensor terminal ST, or a process of relaying and transferring the sensor data received from the designated sensor terminal ST.

A communication managing unit 22 of the processing apparatus 20 has a function of distributing, to the sensor relay apparatus 10, a command update instruction which instructs update of a command designating the sensor terminal ST, in accordance with an instruction from the administrator.

[Operation of Second Embodiment]

Figure 11:
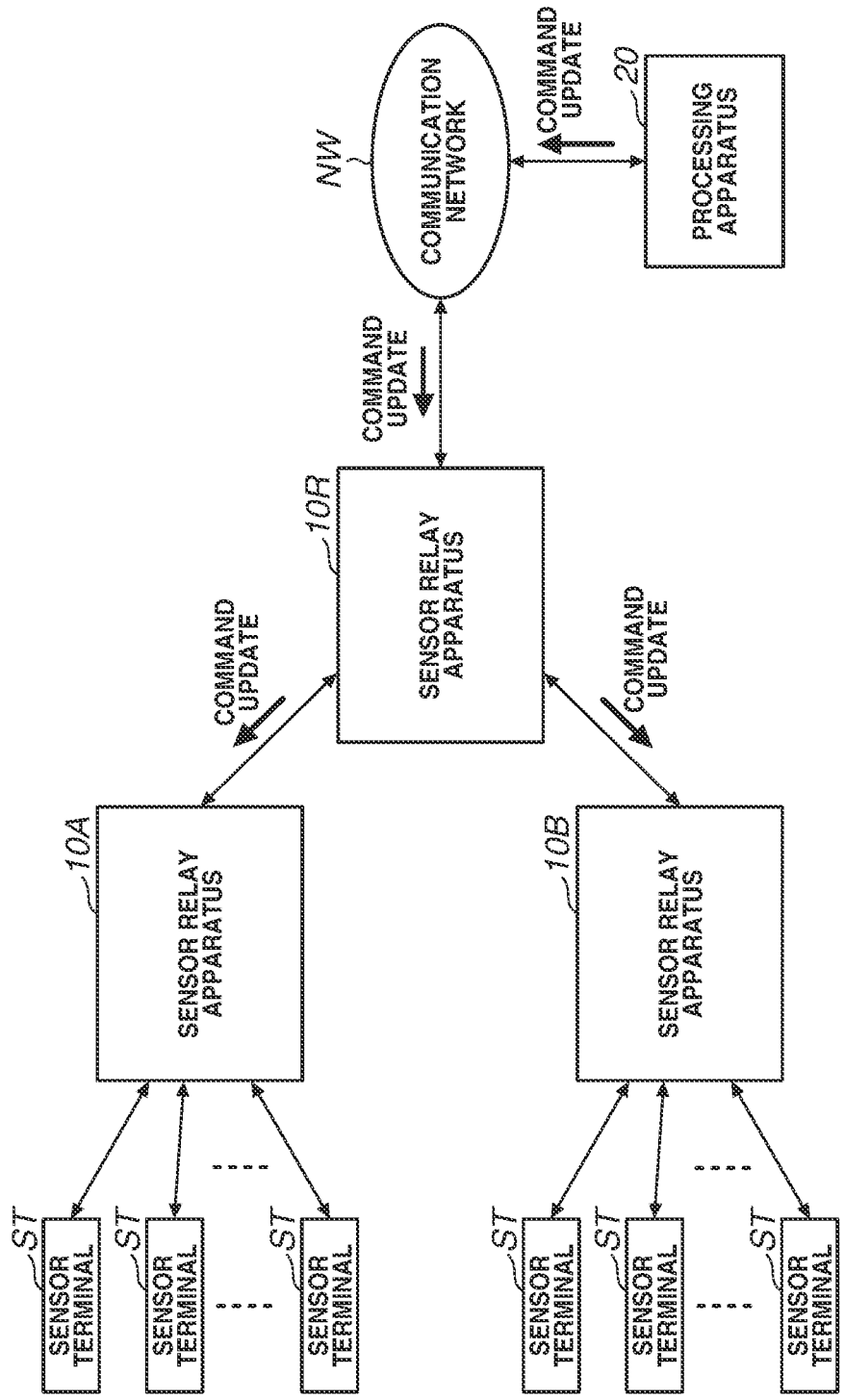
FIG. 11 is a diagram for explaining a distribution example of a command update instruction.
Figure 12:
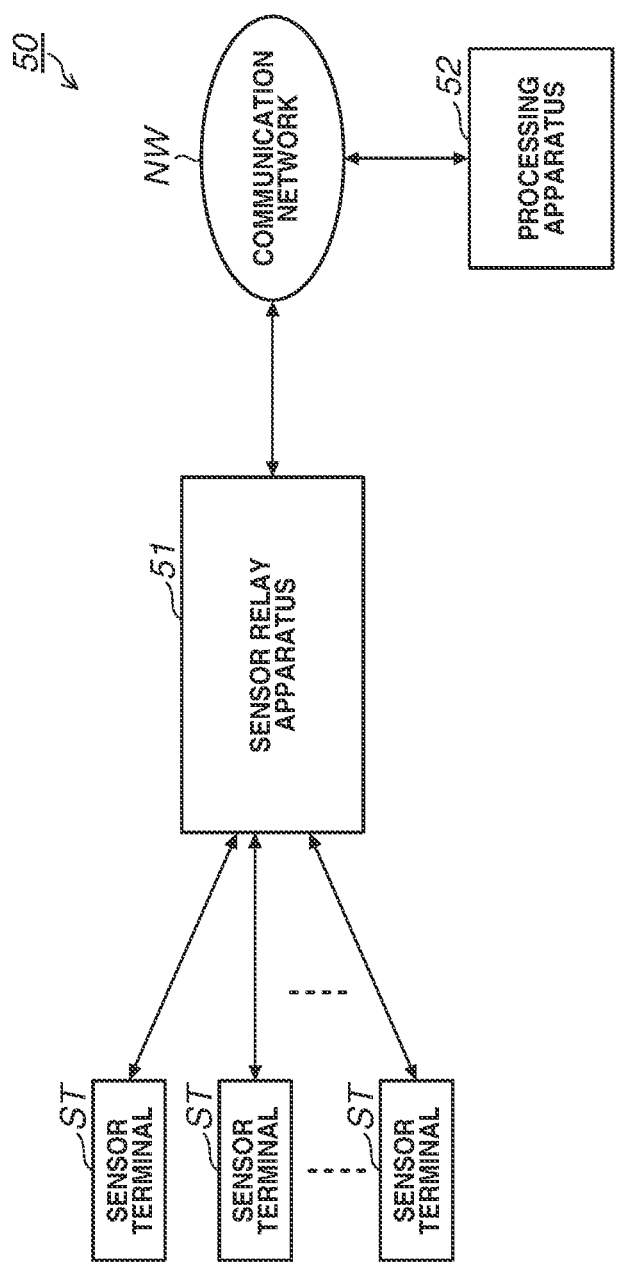
FIG. 12 is a block diagram showing a conventional general sensor relay system.

The operation of the sensor relay system 1 according to this embodiment will be explained below with reference to FIG. 11, by taking a case in which the processing apparatus 20 notifies the sensor relay apparatus 10 of a command update instruction. Referring to FIG. 11, a sensor relay apparatus 10R is connected to a communication network NW, and two sensor relay apparatuses 10A and 10B are connected to the sensor relay apparatus 10R. A plurality of sensor terminals ST are connected to each of the sensor relay apparatuses 10A and 10B.

A command update instruction transmitted from the processing apparatus 20 is received by the sensor relay apparatus 10R via the communication network NW, and distributed to the sensor relay apparatuses 10A and 10B.

In response to the reception of the command update instruction, the relay managing unit 16 of each of the sensor relay apparatuses 10A and 10B stores a new command designated by the command update instruction in a storage unit 11, and outputs the command to the relay processing unit 12.

Based on the command from the relay managing unit 16, the relay processing unit 12 controls communication with the designated sensor terminal ST and the relay/transfer process.

Consequently, communication with the designated sensor terminal ST, the process of receiving sensor data, and the process of relaying and transferring the sensor data received from the designated sensor terminal ST, are controlled in accordance with instructions from the processing apparatus 20. Therefore, the processing apparatus 20 remotely controls an arbitrary processing operation, such as the start of a processing operation after a new module is added to the sensor relay apparatus 10.

[Effects of Second Embodiment]

In this embodiment as described above, in response to a command update instruction notified from the processing apparatus 20, the relay managing unit 16 of the sensor relay apparatus 10 outputs a command designated by the command update instruction to the relay processing unit 12. In response to this command, the relay processing unit 12 controls communication with the designated sensor terminal ST, the process of receiving sensor data from the designated sensor terminal ST, or the process of relaying and transferring the sensor data.

Accordingly, when the sensor relay apparatus 10 is operating such as when a new additional module 14 is added, the processing apparatus 20 can remotely control a processing operation such as the start of a processing operation. This makes it possible to greatly reduce the workload involving, e.g., a processing operation in the sensor relay apparatus 10.

[Extension of Embodiments]

The present invention has been explained above by referring to the embodiments, but the present invention is not limited to the above embodiments. Various changes understandable by those skilled in the art can be made on the arrangements and details of the present invention without departing from the scope of the invention. In addition, these embodiments can be carried out in the form of an arbitrary combination without any contradiction.

EXPLANATION OF THE REFERENCE NUMERALS AND SIGNS

1 . . . sensor relay system, 10 . . . sensor relay apparatus, 11 . . . storage unit, 12 . . . relay processing unit, 16 . . . relay managing unit, 20 . . . processing apparatus, 21 . . . data processing unit, 22 . . . communication managing unit, 22B . . . communication protocol correspondence list, 22C . . . communication format, ST . . . sensor terminal

The invention claimed is:

1. A sensor relay apparatus for relaying and transferring sensor data detected by a plurality of sensor terminals to a processing apparatus, comprising:
a storage device configured to store a communication protocol correspondence list in which the plurality of sensor terminals and the processing apparatus and communication protocols are registered in association with each other, and communication formats to be used in the respective communication protocols;
a relay processor configured to specify respective communication protocols associated with a sensor terminal and the processing apparatus by referring to the communication protocol correspondence list stored in the storage device, receive the sensor data from the plurality of sensor terminals by communicating with the plurality of sensor terminals based on the respective communication protocols, convert a format of the sensor data based on a communication format corresponding to the communication protocol which is used to receive the sensor data, and relay and transfer the sensor data to the processing apparatus;
a relay managing circuit configured to update the communication protocol correspondence list or the communication formats stored in the storage device, when a new communication protocol correspondence list or a new communication format is newly notified by the processing apparatus, based on the new communication protocol correspondence list or the new communication format; and
an expansion port configured to connect a communication module for communicating with at least one of the plurality of sensor terminals and the processing apparatus,
wherein the relay processor is configured to re-establish communication with the processing apparatus using a new communication protocol associated with the processing apparatus by referring to the communication protocol correspondence list updated by the relay managing circuit after communication with the processing apparatus is temporarily interrupted when the communication module is removed from the expansion port and a new communication module for the new communication protocol is connected to the expansion port.

2. The sensor relay apparatus according to claim 1, wherein the relay managing circuit notifies the processing apparatus of additional connection of the communication module when the communication module is connected to the expansion port, receive a communication protocol correspondence list or a communication format newly notified from the processing apparatus in response to notification of the additional connection of the communication module, and updates the communication protocol correspondence list or the communication formats in the storage device based on the communication protocol correspondence list or a communication format newly notified from the processing apparatus.

3. The sensor relay apparatus according to claim 2, wherein the relay managing circuit notifies the processing apparatus of list addition in response to additional connection of a new sensor terminal, receive a communication protocol correspondence list or a communication format newly notified from the processing apparatus in response to the notification, and updates the communication protocol correspondence list or the communication format in the storage device based on the communication protocol correspondence list or a communication format newly notified from the processing apparatus.

4. The sensor relay apparatus according to claim 2, wherein the relay managing circuit outputs, in response to a command update instruction notified from the processing apparatus, a command as instructed by the command update instruction to the relay processor, and the relay processor controls, in response to the command from the relay managing circuit, communication with a designated sensor terminal that is designated among the sensor terminals, a process of receiving sensor data from the designated sensor terminal, or a process of relaying and transferring the sensor data.

5. The sensor relay apparatus according to claim 3, wherein in response to connectability with the new sensor terminal notified from the processing apparatus in response to the list addition, the relay managing circuit instructs the relay processor whether to communicate with the new sensor terminal.

6. The sensor relay apparatus according to claim 3, wherein
the relay managing circuit outputs, in response to a command update instruction notified from the processing apparatus, a command as instructed by the command update instruction to the relay processor, and
the relay processor controls, in response to the command from the relay managing circuit, communication with a designated sensor terminal that is designated among the sensor terminals, a process of receiving sensor data from the designated sensor terminal, or a process of relaying and transferring the sensor data.

7. The sensor relay apparatus according to claim 5, wherein
the relay managing circuit outputs, in response to a command update instruction notified from the processing apparatus, a command as instructed by the command update instruction to the relay processor, and
the relay processor controls, in response to the command from the relay managing circuit, communication with a designated sensor terminal that is designated among the sensor terminals, a process of receiving sensor data from the designated sensor terminal, or a process of relaying and transferring the sensor data.

8. The sensor relay apparatus according to claim 1, wherein the relay managing circuit notifies the processing apparatus of list addition in response to additional connection of a new sensor terminal, receive a communication protocol correspondence list or a communication format newly notified from the processing apparatus in response to the notification, and updates the communication protocol correspondence list or the communication format in the storage device based on the communication protocol correspondence list or a communication format newly notified from the processing apparatus.

9. The sensor relay apparatus according to claim 8, wherein in response to connectability with the new sensor terminal notified from the processing apparatus in response to the list addition, the relay managing circuit instructs the relay processor whether to communicate with the new sensor terminal.

10. The sensor relay apparatus according to claim 8, wherein
the relay managing circuit outputs, in response to a command update instruction notified from the processing apparatus, a command as instructed by the command update instruction to the relay processor, and
the relay processor controls, in response to the command from the relay managing circuit, communication with a designated sensor terminal that is designated among the sensor terminals, a process of receiving sensor data from the designated sensor terminal, or a process of relaying and transferring the sensor data.

11. The sensor relay apparatus according to claim 9, wherein
the relay managing circuit outputs, in response to a command update instruction notified from the processing apparatus, a command as instructed by the command update instruction to the relay processor, and
the relay processor controls, in response to the command from the relay managing circuit, communication with a designated sensor terminal that is designated among the sensor terminals, a process of receiving sensor data from the designated sensor terminal, or a process of relaying and transferring the sensor data.

12. The sensor relay apparatus according to claim 1, wherein
the relay managing circuit outputs, in response to a command update instruction notified from the processing apparatus, a command as instructed by the command update instruction to the relay processor, and
the relay processor controls, in response to the command from the relay managing circuit, communication with a designated sensor terminal that is designated among the sensor terminals, a process of receiving sensor data from the designated sensor terminal, or a process of relaying and transferring the sensor data.

13. A sensor relay system comprising a plurality of sensor relay apparatuses configured to relay and transfer sensor data detected by a plurality of sensor terminals, and a processing apparatus configured to process the sensor data relayed and transferred from the sensor relay apparatus, wherein the sensor relay apparatus is a sensor relay apparatus cited in claim 1.

14. A sensor relay system comprising a plurality of sensor relay apparatuses configured to relay and transfer sensor data detected by a plurality of sensor terminals, and a processing apparatus configured to process the sensor data relayed and transferred from the sensor relay apparatus, wherein the sensor relay apparatus is a sensor relay apparatus cited in claim 2.

15. A sensor relay system comprising a plurality of sensor relay apparatuses configured to relay and transfer sensor data detected by a plurality of sensor terminals, and a processing apparatus configured to process the sensor data relayed and transferred from the sensor relay apparatus, wherein the sensor relay apparatus is a sensor relay apparatus cited in claim 8.

16. A sensor relay system comprising a plurality of sensor relay apparatuses configured to relay and transfer sensor data detected by a plurality of sensor terminals, and a processing apparatus configured to process the sensor data relayed and transferred from the sensor relay apparatus, wherein the sensor relay apparatus is a sensor relay apparatus cited in claim 9.

17. A sensor relay system comprising a plurality of sensor relay apparatuses configured to relay and transfer sensor data detected by a plurality of sensor terminals, and a processing apparatus configured to process the sensor data relayed and transferred from the sensor relay apparatus, wherein the sensor relay apparatus is a sensor relay apparatus cited in claim 12.

18. A sensor relay system comprising a plurality of sensor relay apparatuses configured to relay and transfer sensor data detected by a plurality of sensor terminals, and a processing apparatus configured to process the sensor data relayed and transferred from the sensor relay apparatus, wherein the sensor relay apparatus is a sensor relay apparatus cited in claim 3.

19. A sensor relay system comprising a plurality of sensor relay apparatuses configured to relay and transfer sensor data detected by a plurality of sensor terminals, and a processing apparatus configured to process the sensor data relayed and transferred from the sensor relay apparatus, wherein the sensor relay apparatus is a sensor relay apparatus cited in claim 5.

20. A sensor relay system comprising a plurality of sensor relay apparatuses configured to relay and transfer sensor data detected by a plurality of sensor terminals, and a processing apparatus configured to process the sensor data relayed and transferred from the sensor relay apparatus, wherein the sensor relay apparatus is a sensor relay apparatus cited in claim 4.

\* \* \* \* \*